US010306200B2

(12) United States Patent
Rodriguez et al.

(10) Patent No.: US 10,306,200 B2
(45) Date of Patent: May 28, 2019

(54) EFFICIENT 10-BIT PIXEL FORMATTING OF UNCOMPRESSED 4K VIDEO SIGNALS FOR DISTRIBUTED PROCESSING

(71) Applicant: Cisco Technology, Inc., San Jose, CA (US)

(72) Inventors: Arturo A. Rodriguez, Norcross, GA (US); Benjamin Lorne Walton, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 15/623,741

(22) Filed: Jun. 15, 2017

(65) Prior Publication Data

US 2018/0367779 A1 Dec. 20, 2018

(51) Int. Cl.
*H04N 11/20* (2006.01)
*H04N 11/24* (2006.01)
*H04N 21/2343* (2011.01)

(52) U.S. Cl.
CPC ........... *H04N 11/20* (2013.01); *H04N 11/002* (2013.01); *H04N 21/234363* (2013.01)

(58) Field of Classification Search
CPC ................. H04N 11/20; H04N 11/002; H04N 21/234363
USPC ..... 348/453, 450, 444, 426.1, 715, 630, 708
See application file for complete search history.

(56) References Cited

U.S. PATENT DOCUMENTS 7,649,539 B2 * 1/2010 Evans .................... H04N 19/61
345/589
9,978,156 B2 * 5/2018 MacInnis ............... H04N 19/14

* cited by examiner

*Primary Examiner* — Jefferey F Harold
*Assistant Examiner* — Jean W Desir
(74) *Attorney, Agent, or Firm* — Merchant & Gould P.C.

(57) ABSTRACT

A method including: receiving 16 10-bit Y samples stored in respective 16-bit words; logically ORing the 16 10-bit Y samples with the lowest 5-bits corresponding to each of the next 16 10-bit U samples; receiving the first consecutive 16 10-bit Y samples stored in respective 16-bit words; logically ORing the next consecutive 16 10-bit Y samples with the highest 5-bits corresponding to each of the next 16 10-bit U samples; receiving the second consecutive 16 10-bit Y samples stored in respective 16-bit words, logically ORing the second consecutive 16 10-bit Y samples with the lowest 5-bits corresponding to each of the next 16 10-bit V samples; receiving the third consecutive 16 10-bit Y samples stored in respective 16-bit words; and logically ORing the third consecutive 16 10-bit Y samples with the highest 5-bits corresponding to each of the next 16 10-bit V samples.

20 Claims, 4 Drawing Sheets

EFFICIENT 10-BIT PIXEL FORMATTING OF UNCOMPRESSED 4K VIDEO SIGNALS FOR DISTRIBUTED PROCESSING

TECHNICAL FIELD

This disclosure relates in general to processing of video signals, and more particularly, to efficient 10-bit sample formatting of 4K video signals for distributed processing.

BACKGROUND

A digital video signal is characterized by picture format information and other associated parameters. Typically, the format of a video signal includes the spatial resolution of the picture, frame rate, and the bit-depth of samples (i.e., pixels), as well as the relational storage (or transmission) order of the samples corresponding to each of the three components of the digital video signal: the luma component (Y) and the chroma components, U and V. The spatial sampling arrangement of the three components in relation to each other is also part of the picture format information.

Digital video signals typically employ YUV components and conform to a 4:2:0 sampling arrangement with a relative ordering of its three components referred to as planar format. A digital video signal in YUV 4:2:0 planar format consists of all the samples of the Y component in raster scan order, followed by all the samples of the U component in raster scan order, followed by all of the samples of the V component in raster scan order. In planar format, each of the three components, Y, U, and V, can be indexed in storage by a respective pointer and processed independently and sequentially. The spatial resolution of a YUV digital video signal corresponds to the spatial resolution of the Y component. The spatial resolution of each of the respective chroma components of a YUV 4:2:0 digital video signal corresponds to half of the horizontal resolution of the Y component and half of the vertical resolution of the Y component. Since the total number of samples of each of the two chroma components of a picture is equal to one fourth of the total number of samples of the luma component, a YUV 4:2:0 picture results in an average of 1.5 samples per pixel.

Other associated parameters that characterize a digital video signal include the sample aspect ratio, the scan type of the pixels in each picture, the spatial offset (or location) of the chroma samples in relation to each corresponding set of 2 by 2 luma samples in each picture, information related to its opto-electrical transfer function, and colorimetry information.

Many video applications have traditionally employed digital video signals with samples of 8-bit resolution for each of the three components of each picture. In the aim for picture quality that is better than High Definition (HD) video signals, Ultra HD (UHD) video signals, also referred to as 4K video signals, typically have 10-bit samples (i.e., 10-bit samples in each of the three components of the digital video signal). Whereas 8-bit samples have been amenable to the traditional byte-aligned de facto digital world, processing video signals with 10-bit pixels creates new challenges.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
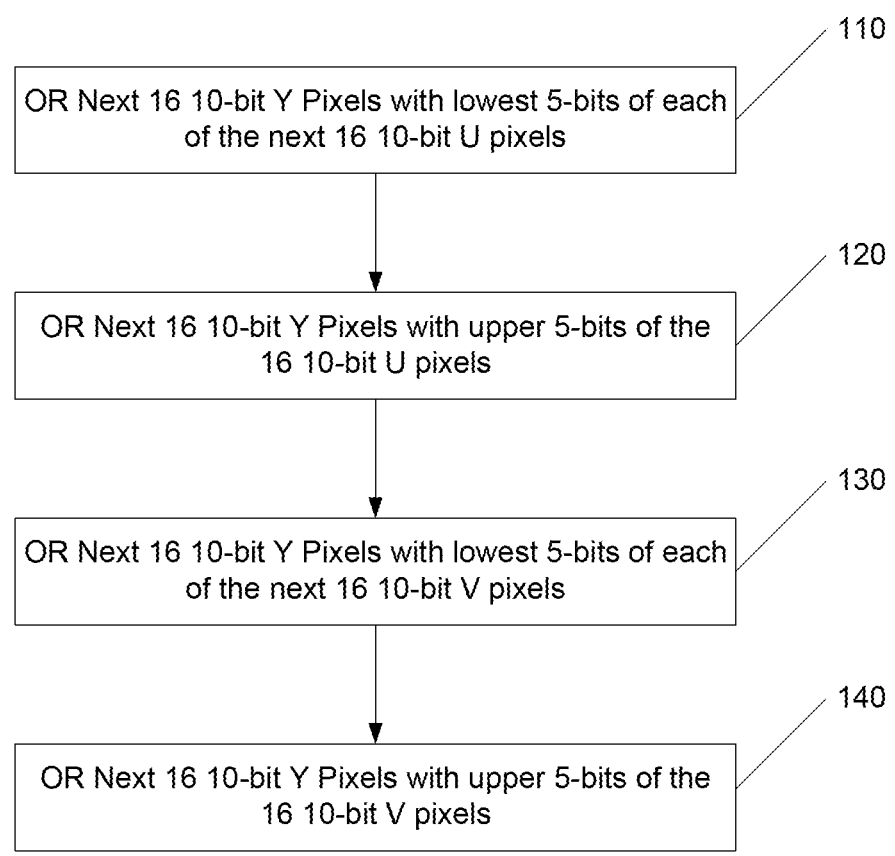
FIG. 1 is a flow chart of a process of efficient 10-bit sample packing for distributed processing of 4K video in accordance with a first conversion operation.

Methods and systems are disclosed for a first conversion of a picture sequence from a first uncompressed picture format (UPF) to a second uncompressed picture format (UPF), where the first conversion corresponds to the efficient packing of the 10-bit samples of each respective picture in the picture sequence. Methods and systems are also disclosed for a second conversion of a picture sequence from the second UPF to the first UPF, where the second conversion corresponds to the efficient de-packing of the packed 10-bit samples of each respective picture in the picture sequence.

An apparatus comprising a memory and one or more processors configured to execute a conversion of uncompressed pictures with 10-bit samples is provided. Each input picture to a "first conversion" operation, or output as a result of the execution of a second conversion operation, is an uncompressed picture stored in the memory in three separate 16-bit word arrays corresponding respectively to the three components related to the color and brightness information of the video signal. Each 10-bit sample of each respective component is stored in the lower 10-bits of a 16-bit word in that respective component's corresponding array. The 10-bit samples are stored in each array in raster-scan-order.

Execution of conversion between UPFs may include execution of instructions stored in the memory. Execution of the first conversion includes: inputting the samples of each of the three components of each respective picture from memory as three respective sample arrays, where each sample in each of the three arrays corresponds to a 10-bit sample stored in the lowest 10-bits of a 16-bit word; receiving n 10-bit Y samples stored in respective 16-bit words, where n is an integer greater than or equal to 1; logically ORing the n 10-bit Y samples with the lowest 5-bits corresponding to each of the next n 10-bit U samples; receiving the first consecutive n 10-bit Y samples stored in respective 16-bit words; logically ORing the next consecutive n 10-bit Y samples with the highest 5-bits corresponding to each of the next n 10-bit U samples; receiving the second consecutive n 10-bit Y samples stored in respective 16-bit words, logically ORing the second consecutive n 10-bit Y samples with the lowest 5-bits corresponding to each of the next n 10-bit V samples; receiving the third consecutive n 10-bit Y samples stored in respective 16-bit words; and logically ORing the third consecutive n 10-bit Y samples with the highest 5-bits corresponding to each of the next n 10-bit V samples.

Additional embodiments include a method. The method includes: receiving n 10-bit Y samples stored in respective 16-bit words, where n is an integer greater than or equal to 1; logically ORing the n 10-bit Y samples with the lowest 5-bits corresponding to each of the next n 10-bit U samples; receiving the first consecutive n 10-bit Y samples stored in respective 16-bit words; logically ORing the next consecutive n 10-bit Y samples with the highest 5-bits corresponding to each of the next n 10-bit U samples; receiving the second consecutive n 10-bit Y samples stored in respective 16-bit words; logically ORing the second consecutive n 10-bit Y samples with the lowest 5-bits corresponding to each of the next n 10-bit V samples; receiving the third consecutive n 10-bit Y samples stored in respective 16-bit words; and logically ORing the third consecutive n 10-bit Y samples with the highest 5-bits corresponding to each of the next n 10-bit V samples.

Other embodiments include an apparatus comprising: a memory; and one or more processors configured to execute instructions stored in the memory is provided. The instructions include: receiving n 10-bit packed samples stored in respective 16-bit words, where n is an integer greater than or equal to 1; retrieving n 10-bit Y components from the n 10-bit packed samples; retrieving n 10-bit U lower bits from the n 10-bit packed samples; receiving a first consecutive n 10-bit packed samples stored in respective 16-bit words; retrieving n 10-bit Y components from the first consecutive n 10-bit packed samples; retrieving n 10-bit U upper bits from the first consecutive n 10-bit packed samples; receiving a second consecutive n 10-bit packed samples stored in respective 16-bit words; retrieving n 10-bit Y components from the second consecutive n 10-bit packed samples; retrieving n 10-bit V lower bits from the second consecutive n 10-bit packed samples; receiving a third consecutive n 10-bit packed samples stored in respective 16-bit words; retrieving n 10-bit Y components from the third consecutive n 10-bit packed samples; and retrieving n 10-bit V upper bits from the third consecutive n 10-bit packed samples.

Additional embodiments include a method. The method includes: receiving n 10-bit packed samples stored in respective 16-bit words, where n is an integer greater than or equal to 1; retrieving n 10-bit Y components from the n 10-bit packed samples; retrieving n 10-bit U lower bits from the n 10-bit packed samples; receiving a first consecutive n 10-bit packed samples stored in respective 16-bit words; retrieving n 10-bit Y components from the first consecutive n 10-bit packed samples; retrieving n 10-bit U upper bits from the first consecutive n 10-bit packed samples; receiving a second consecutive n 10-bit packed samples stored in respective 16-bit words; retrieving n 10-bit Y components from the second consecutive n 10-bit packed samples; retrieving n 10-bit V lower bits from the second consecutive n 10-bit packed samples; receiving a third consecutive n 10-bit packed samples stored in respective 16-bit words; retrieving n 10-bit Y components from the third consecutive n 10-bit packed samples; and retrieving n 10-bit V upper bits from the third consecutive n 10-bit packed samples.

Additional embodiments include a method. The method includes: receiving a first sixteen 10-bit group of Y samples and sixteen 10-bit U samples stored in respective 16-bit words; storing the lower 5-bits of each respective U sample in the upper byte of each respective Y sample in the first sixteen 10-bit group of Y samples; receiving a second sixteen 10-bit group of Y samples; storing the upper 5-bits of each respective U sample in the upper byte of each respective Y sample in the second sixteen 10-bit group of Y samples; receiving a third sixteen 10-bit group of Y samples and sixteen 10-bit V samples stored in respective 16-bit words; storing the lower 5-bits of each respective V sample in the upper byte of each respective Y sample in the third sixteen 10-bit group of Y samples; receiving a fourth sixteen 10-bit group of Y samples; and storing the upper 5-bits of each respective v sample in the upper byte of each respective Y sample in the fourth sixteen 10-bit group of Y samples.

Example Embodiments

Memory, storage, and vector processing hardware in machines, such as X86 architectures, are structured for execution of operations on byte-aligned data. Vector processing units that extend single-instruction-multiple data ("SIMD") execution capabilities also adhere to data in integer multiples of bytes. Consequently, 10-bit samples are stored and processed in a respectively corresponding 16-bit words.

The vast amount of computation used in video processing operations coupled with the copious data in UHD video signals may result in systems that perform certain types of 4K video processing operations in plural interconnected machines. These video processing machines may be interconnected via, for example, a 10 Gbit Ethernet port.

A UHD video signal typically consists of pictures with a spatial resolution equal to 3840×2160 with a frame-rate of up to 60 frames per second (fps). Since the three components of each YUV 4:2:0 picture result in an average of 1.5 samples per pixel, a UHD video signal with 10-bit samples in respective 16-bit words exceeds the physical limit of a 10 Gbit Ethernet port as evident from the resulting bandwidth in the following calculation:

$$3840\times2160\times1.5\times16\text{-bits/sample}\times60 \text{ fps}= 11.9439 \text{ Gbits/sec.}$$

The actual total bandwidth of an uncompressed UHD video signal at 60 fps with 10-bits per sample is:

$$3840\times2160\times1.5\times10\text{-bits/sample}\times60 \text{ fps}= 7.465 \text{ Gbits/sec.}$$

In summary, digital video signals with pixels of 10-bit resolution are stored and processed as 10-bit samples in respective 16-bit words to perform video processing operations such as video decoding and video coding. Transmission of uncompressed digital video signals between machines connected via 10 Gbit Ethernet ports as required to perform a video application (or video processing operation) involves formatting the 10-bit samples from their respective 16-bit words in a format that reduces the transmission bandwidth. The format is then amenable for efficient conversion of 10-bit-samples stored in 16-bit words and efficient conversion back to 16-bit words.

Disclosed is a packing arrangement with an effective payload of 15-bits per each transmitted 16-bit word, or equivalently one unused bit per 16-bit word corresponding to each respective Y sample rather than six unused bits.

The required bandwidth is:

$$3840\times2160\times16\text{-bit/sample}\times60 \text{ fps}=7.9626 \text{ Gbits/sec.}$$

Thus, the required bandwidth may be met by 10 Gbit Ethernet. Each 10-bit Y sample in a respective 16-bit word is kept intact. Since each chroma component in YUV 4:2:0 has half of the luma component's horizontal resolution and half of the luma component's vertical resolution, each 10-bit chroma sample is split into the five lowest significant bits and five highest significant bits. Each 5-bit portion is stored within the highest six bits of a 10-bit luma sample in a 16-bit word since those six bits were unused. Each 5-bit portion may be stored in bits [14:10].

The one or more processors are capable of performing single instruction multiple data ("SIMD") operations on n 16-bit words, where n is greater than one. In one embodiment, n is equal to 16 and the registers used for SIMD operands are 256-bit registers, and the SIMD instructions may be the advanced vector extensions ("AVX2") instructions of X86 processors. Irrespective of chroma and luma spatial relationship, 16 samples of each respective component (Y, U, and V) are processed sequentially by loading sixteen samples at a time (i.e., since they are in planar format).

The three components of the digital video signal relate to the color and brightness information of the digital video signal and may be referred to as a first component, a second component, and a third component. In one embodiment, the first component corresponds to the Y component, the second component corresponds to the U component, and the third component corresponds to the V component of the digital video signal. The Y, U, and V components may be referred to as YUV. The Y, U, and V components may represent respectively Y, Cb, and Cr components.

A picture, formatted or represented according to the first UPF may be referred to as a first-UPF picture. Likewise, a picture, formatted or represented according to the second UPF may be referred to as a second-UPF picture. A first-UPF picture, or any portions of it, is interpreted and processed according to the first UPF. A second-UPF picture, or any portions of it, is interpreted and processed according to the second UPF. A first-UPF picture, or any portions of it, is stored, written, accessed or read from memory or storage in accordance with the first UPF. A second-UPF picture, or any portions of it, is stored, written, accessed or read from memory or storage in accordance with the second UPF.

The first UPF corresponds to the YUV 4:2:0 planar format. Each first-UPF picture stored in or read from memory consists of all the samples of the Y component in raster scan order in a first array, followed by all the samples of the U component in raster scan order in a second array, followed by all of the samples of the V component in raster scan order in a third array. Each sample of the three components of a first-UPF picture is stored in the lower 10-bits of a 16-bit word in its respective array.

Each of the respective arrays corresponding to the three components, Y, U, and V, of a first-UPF picture can be accessed by a respective pointer to their memory location and each of the three respective arrays can be processed independently and sequentially in raster scan order. The term "accessed in memory" refers to an operation such as reading, writing, or storing samples in memory.

The spatial resolution of a first-UPF picture corresponds to the spatial resolution of the Y component. The spatial resolution of each of the respective chroma components of a first-UPF picture corresponds to half of the horizontal resolution of the Y component and half of the vertical resolution of the Y component. Each sample of the three components of a first-UPF format is stored in the lower 10-bits of a 16-bit word in its respective array. The three arrays corresponding to each respective first-UPF picture may correspond to contiguous memory locations, such that the memory address or location of the first sample of the second component immediately follows the memory location of the last sample of the first component, and the memory location of the first sample of the third component immediately follows the memory location of the last sample of the second component. In one embodiment, the memory is DDR (dual data rate) RAM (random access memory), and the memory location of the first sample of the second component corresponds to the first memory location of the DDR page that immediately follows the DDR page containing the last sample of the first component, and the first sample of the third component corresponds to the first memory location of the DDR page that immediately follows the DDR page containing the last sample of the second component.

Throughout this specification, reading or writing of samples refers to samples stored in DDR or in one or more cache memories that are local and coupled to one or more processors capable of executing SIMD operations (or instructions), where such one or more cache memories are housed with the one or more processors in the same packaged physical electronic device, such as a multi-core X-86 device, and where such one or more cache memories may correspond to a multi-level cache memory system designed to provide faster access to data such as the samples of an uncompressed picture.

Pointers Py, Pu, and Pv of a first-UPF picture point to the location of the three respective arrays of 16-bit words in memory. Pointer Pp of a second-UPF picture points to the array in memory corresponding to the second-UPF picture. The size of the array of 16-bit words corresponding to the second-UPF picture may be equal to the size of the Y sample array.

Throughout this specification, 10-bit pixels may be used to refer to the 10-bit samples of the Y, U, or V component of the digital video signal, or to the 10-bit samples of the Y, U, and V components of the digital video signal. A digital video signal in uncompressed form may be referred to as a sequence of uncompressed pictures or as a sequence of pictures.

Execution of the first conversion from the first UPR to the second UPR includes: reading the samples of each first-UPF picture from the three respective sample arrays, where samples from each respective array are read in sets of n 16-bit words, where the value of n is an integer greater than 1 such that the value of n 16-bit words equals the length of the registers (or vectors) used in the execution of SIMD operations in the one or more processors to perform the first conversion. In one embodiment the length of the register used for SIMD operations is 256-bits, n is equal to 16, and each read operation to a sample array receives and loads into a register sixteen 16-bit words, where each 16-bit word contains a respective 10-bit sample in its 10 lowest bits [9:0], and thereafter, if not at the end of the first-UPF picture, the pointer to that respective sample array is advanced by a value of 16 words for the subsequent read operation for the next set of 16 words from that array. For each first-UPF picture, the reading of sets of 16 words from each respective array is done iteratively in raster scan order until the samples of the first-UPF picture are processed in accordance with the first conversion operation.

First Conversion Operation

For each k first-UPF picture to be converted to a corresponding second-UPF picture, where k is an integer greater or equal to one, and for all of the following registers of the one or more processors having a length of n 16-bits words for the respective operands for the SIMD instructions performed by one of the one or more processors, the steps of performing a first conversion include:

1. Obtain pointers Py, Pu, and Pv to the current first-UPF picture's three respective arrays of 16-bit words in memory, and obtain pointer Pp to the array in memory corresponding to the current second-UPF picture to be produced by the first conversion;

2. Receive into a first register n consecutive 16-bit words by reading from the memory location pointed to by Py;

3. Receive into a second register n consecutive 16-bit words by reading from the memory location pointed to by Pu;

4. Receive into a third register the result of performing a SIMD logical AND operation of the second register with hexadecimal value 0x001F, resulting in retaining the lower 5-bits [4:0] of each of the respective n 10-bit samples of the U component and zeroing all of the other bits of each of the respective n 16-bit words;

5. Receive into the third register the result of performing a "shift left by 10-bits" operation on the content of the third register, where the lower 5-bits [4:0] of each of the respective n 10-bit samples of the U component are moved to bits [14:10] in each of the n corresponding 16-bit words of the third register;

6. Receive into the third register the result of performing a SIMD logical OR operation of the first register with the third register;

7. Store the n 16-bit words of the third register at the memory location pointed by Pp;

8. Increase pointer Py by n 16-bit words and receive into the first register n consecutive 16-bit words by reading from the memory location pointed to by Py;

9. Receive into the third register the results of performing a SIMD logical AND operation of the second register with hexadecimal value 0x03E0, resulting in retaining the upper 5-bits [9:5] of each of the respective n 10-bit samples of the U component and zeroing all of the other bits of each of the respective n 16-bit words;

10. Receive into the third register the result of performing a "shift left by 5-bits" operation on the content of the third register, where the upper 5-bits [9:5] of each of the respective n 10-bit samples of the U component are moved to bits [14:10] in each of the n corresponding 16-bit words of the third register;

11. Receive into the third register the result of performing a SIMD logical OR operation of the first register with the third register;

12. Increase pointer Pp by n 16-bit words and store the n 16-bit words of the third register at the memory location pointed by Pp;

13. Increase pointer Py by n 16-bit words and receive into the first register n consecutive 16-bit words by reading from the memory location pointed to by Py;

14. Receive into the second register n consecutive 16-bit words by reading from the memory location pointed to by Pv;

15. Receive into the third register the result of performing a SIMD logical AND operation of the second register with hexadecimal value 0x001F, resulting in retaining the lower 5-bits [4:0] of each of the respective n 10-bit samples of the V component and zeroing all of the other bits of each of the respective n 16-bit words;

16. Receive into the third register the result of performing a "shift left by 10-bits" operation on the content of the third register, where the lower 5-bits [4:0] of each of the respective n 10-bit samples of the V component are moved to bits [14:10] in each of the n corresponding 16-bit words of the third register;

17. Receive into the third register the result of performing a SIMD logical OR operation of the first register with the third register;

18. Increase pointer Pp by n 16-bit words and store the n 16-bit words of the third register at the memory location pointed by Pp;

19. Increase pointer Py by n 16-bit words and receive into the first register n consecutive 16-bit words by reading from the memory location pointed to by Py;

20. Receive into the third register the results of performing a SIMD logical AND operation of the second register with hexadecimal value 0x03E0, resulting in retaining the upper 5-bits [9:5] of each of the respective n 10-bit samples of the V component and zeroing all of the other bits of each of the respective n 16-bit words;

21. Receive into the third register the result of performing a "shift left by 5-bits" operation on the content of the third register, where the upper 5-bits [9:5] of each of the respective n 10-bit samples of the V component are moved to bits [14:10] in each of the n corresponding 16-bit words of the third register;

22. Receive into the third register the result of performing a SIMD logical OR operation of the first register with the third register;

23. Increase pointer Pp by n 16-bit words and store the n 16-bit words of the third register at the memory location pointed by Pp;

24. If the n-th 16-bit word of the n 16-bit words pointed to by the current value of pointer Py corresponds to the last 16-bit word of the array corresponding to the Y component, go to Step 25; else increase each of the respective pointers Py, Pu, Pv, and Pp by n 16-bit words and go to Step 2; and 25. If the current first-UPF format is the last or k-th first-UPF picture to be converted to the second-UPF, exit; else make the next first-UPF picture the current first-UPF picture and go to Step 1.

As a result of the first conversion operation, every four successive sets of n 10-bit Y samples have Y sample combined with bits [14:10] in a respective 16-bit word, where the combined bits [14:10] correspond to the five lower or upper 5-bits one of the two chroma 10-bit samples, and where the combining operation corresponds to a logical OR operation. The first of each of the four successive sets of n 10-bit Y samples is combined with the lower 5-bits [4:0] of n 10-bit U samples; the second of each of the four successive sets of n 10-bit Y samples is combined with the upper 5-bits [9:5] of the same n 10-bit U samples; the third of each of the four successive sets of n 10-bit Y samples is combined with the lower 5-bits [4:0] of n 10-bit V samples; and the fourth of each of the successive four sets of n 10-bit Y samples is combined with the upper 5-bits [9:5] of the same n 10-bit V samples.

FIG. 1 is a flow chart of a process of efficient 10-bit sample packing of 4K video in accordance with the first conversion operation where n=16. The process is as follows. For the next set of four 16 10-bit Y samples the first of the four successive sets of 16 10-bit Y samples is OR'ed with the lower 5-bits [4:0] of 16 10-bit U samples (Stage 110); the second of each of the four successive sets of 16 10-bit Y samples is OR'ed with the upper 5-bits [9:5] of the same 16 10-bit U samples (Stage 120); the third of each of the successive four sets of 1610-bit Y samples is OR'ed with the lower 5-bits [4:0] of 16 10-bit V samples (Stage 130); and the fourth of each of the successive four sets of 1610-bit Y samples is OR'ed with the upper 5-bits [9:5] of the same 16 10-bit V samples (Stage 140).

In one embodiment, each respective 5-bits of the 16 chroma sample is derived from the corresponding 16 10-bit chroma samples by zero'ing out the other bits in the 16-bit word with a logical AND operation and then shifting left by 10-bits for the lower 5-bits, and shifting left by 5-bits for the upper 5-bits. In an alternate embodiment, each respective 5-bits of the 16 chroma sample is derived from the corresponding 16 10-bit chroma samples by shifting left by 10-bits for the lower 5-bits or shifting left by 10-bits for the upper 5-bits and then zero'ing out the other bits in the 16-bit word with a logical AND operation. In yet another alternate embodiment, each respective 5-bits of the 16 chroma sample is derived from the corresponding 16 10-bit chroma samples by shifting left by 10-bits for the lower 5-bits or shifting left by 10-bits for the upper 5-bits without performing an logical AND operation to zero out the other bits in the 16-bit word.

Figure 2:
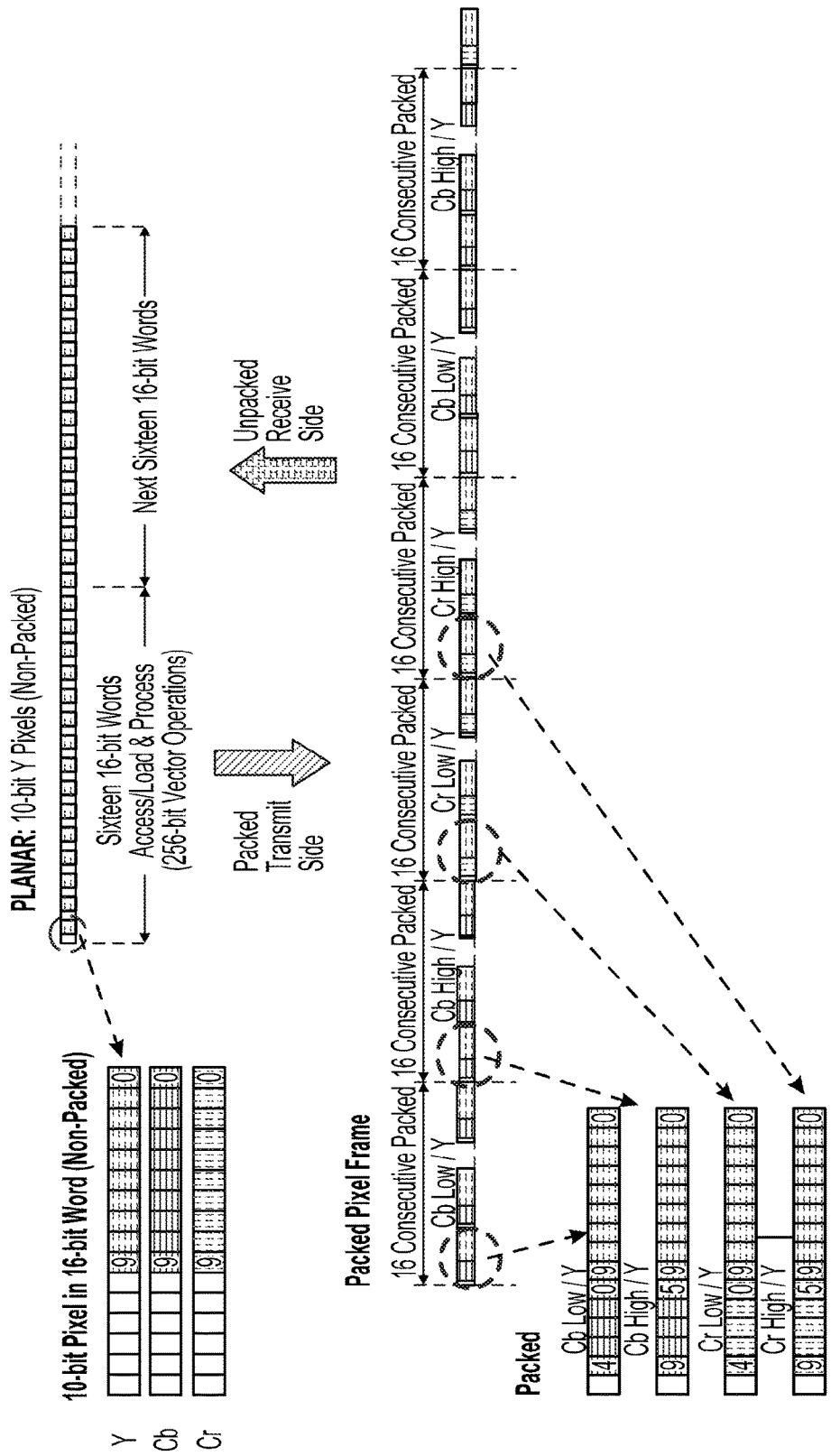
FIG. 2 illustrates the results of the efficient 10-bit sample packing process for distributed processing of 4K video in accordance with a first conversion operation.

FIG. 2 illustrates the results of the efficient 10-bit sample packing process for distributed processing of 4K video. In the unpacked state, at the top of the figure, each Y, U, and V component (or YCbCr component) of a video signal is shown in its planar storage form with all of the Y samples, followed by all of the U samples, followed by all of the V samples, each of which can be indexed by a respective pointer and processed independently and sequentially. Each 10-bit sample is stored in a 16-bit word in this non-packed format, which is the format prior to packing and after unpacking. Following the packing methodology described in FIG. 1, a packed sample frame is illustrated at the bottom of FIG. 2. The packed sample frame has 16 consecutively packed 16-bit words comprising Cb low order bits/Y bits; 16 consecutively packed 16-bit words comprising Cb high order bits/Y bits; 16 consecutively packed 16-bit words comprising Cr low order bits/Y bits; followed by 16 consecutively packed 16-bit words comprising Cr high order bits/Y bits; and then repeating. Also illustrated in this figure are four exemplary packed words: Cb low/Y; Cb high/Y; Cr low/Y; and Cr high/Y.

In an alternate embodiment, shifting is performed prior to masking in each of the above four steps. This permits a single 256-bit register to contain a common mask value for packing both the lower 5-bits and the upper 5-bits.

Figure 3:
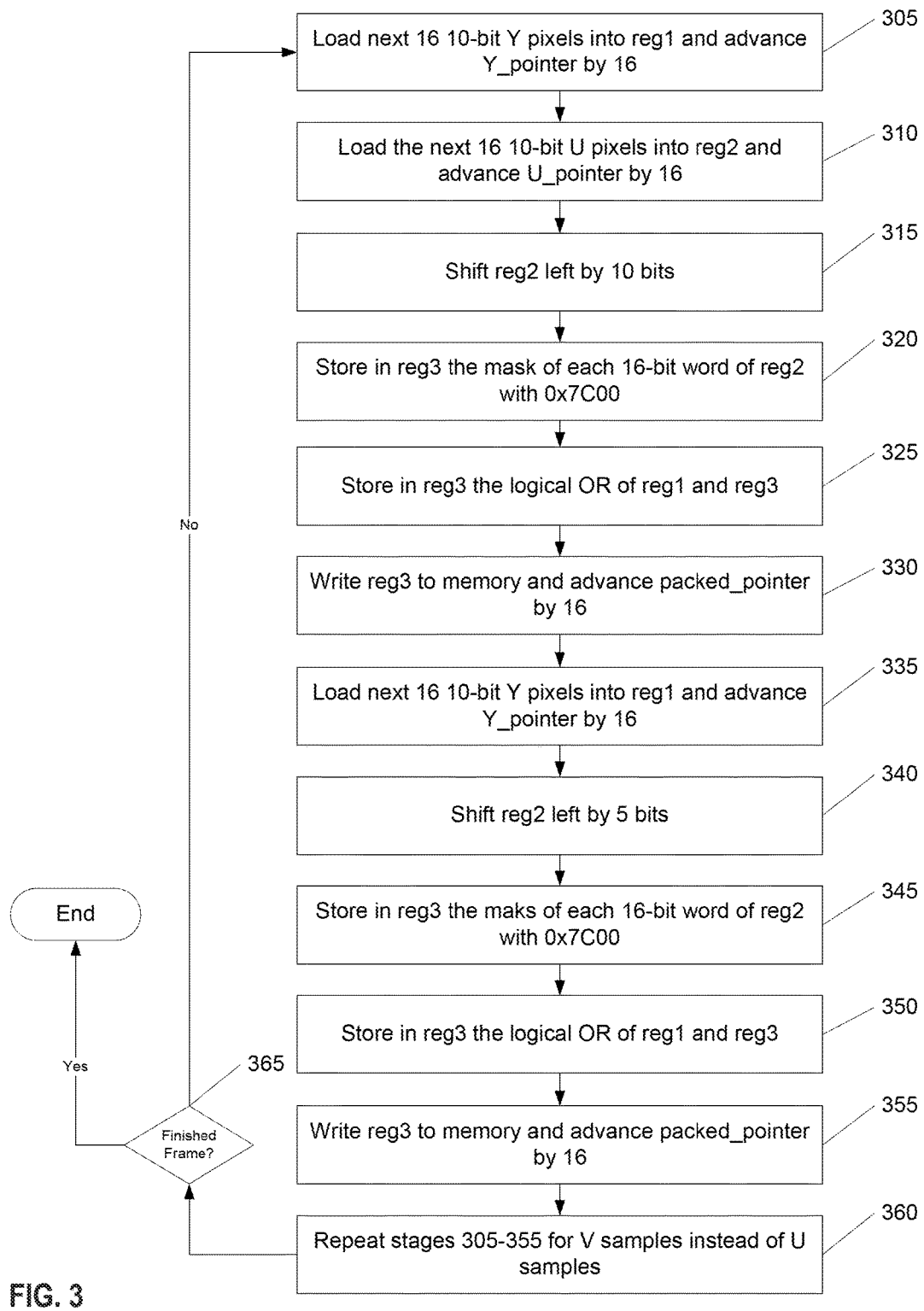
FIG. 3 is a detailed flow chart of a process of efficient 10-bit sample packing for distributed processing of 4K video in accordance with a first conversion operation.

FIG. 3 is a detailed flow chart of a process of efficient 10-bit sample packing for distributed processing of 4K video. Load the next sixteen 10-bit Y samples stored in respective 16-bit words (i.e., 256 bits total) into a first register (reg1) and advance Y_pointer by 16 (stage 305). Load the next sixteen 10-bit U (i.e., Cb) samples stored in respective 16-bit words (i.e., 256 bits) into a second register (reg2), advance U_pointer by 16 (stage 310). Next, shift reg2, i.e., the second register containing the U 10-bit samples, left by 10-bits (stage 315). Store in a third register, reg3, the mask (logical AND operation) of each 16-bit word of reg2 with 0x7C00 to retain the lowest 5-bits of each of the sixteen 10-bit U samples (stage 320). Store in reg3 the logical OR of reg1 and reg3 (stage 325). Write reg3 to memory (pointer to packed sample array) and advance packed_pointer by 16 (stage 330). So, at this point, the method has written Cb low/Y to packed memory.

Next, load the next sixteen 10-bit Y samples stored in respective 16-bit words (i.e., 256 bits total) into the first register (reg1) and advance Y_pointer by 16 (stage 335). Shift reg2 left by 5-bits (recall that reg2 contains the U 10-bit samples) (stage 340). Store in reg3 the mask (logical AND operation) of each 16-bit word of reg2 with 0x7C00 to retain the highest 5-bits of each of the sixteen 10-bit U samples (stage 345). Store in reg3 the logical OR of reg1 and reg3 (stage 350). Write reg3 to memory (pointer to packed sample array) and advance packed_pointer by 16 (stage 355). So, at this point, the method has written Cb high/Y to packed memory. Next, repeat stages 305 through 355 with V samples, instead of U samples (stage 360). If Y-pointer exceeds the end of the Y component (i.e., the total number of pixels in the frame), the method stops, else it resumes at stage 305 (stage 365).

At the end of four rows with length equal to the width of the picture (3840 Y samples for 4K pictures), all of the 10-bit YUV samples of the corresponding four rows are contained in packed form.

In summary, all of the three planar arrays, YUV, are accesses independently (as a one dimensional array) in raster scan order, and likewise the packed frame is stored in raster scan order. The chroma samples are packed into the unused space in each luma word as follows:

For the next sixteen Cb (U) samples (accessed in raster scan order):

Pack Cb[4 . . . 0]=>Y[14 . . . 10] on next set of sixteen Y samples (Y_set_K), and Cb[5 . . . 9]=>Y[14 . . . 10] on next set of sixteen Y samples (Y_set_K+1), For the next sixteen Cr (V) samples:

Pack Cr[4 . . . 0]=>Y[14 . . . 10] on next set of sixteen Y samples (Y_set_K+2), and Cr[5 . . . 9]=>Y[14 . . . 10] on next set of sixteen Y samples (Y_set_K+3).

Figure 4:
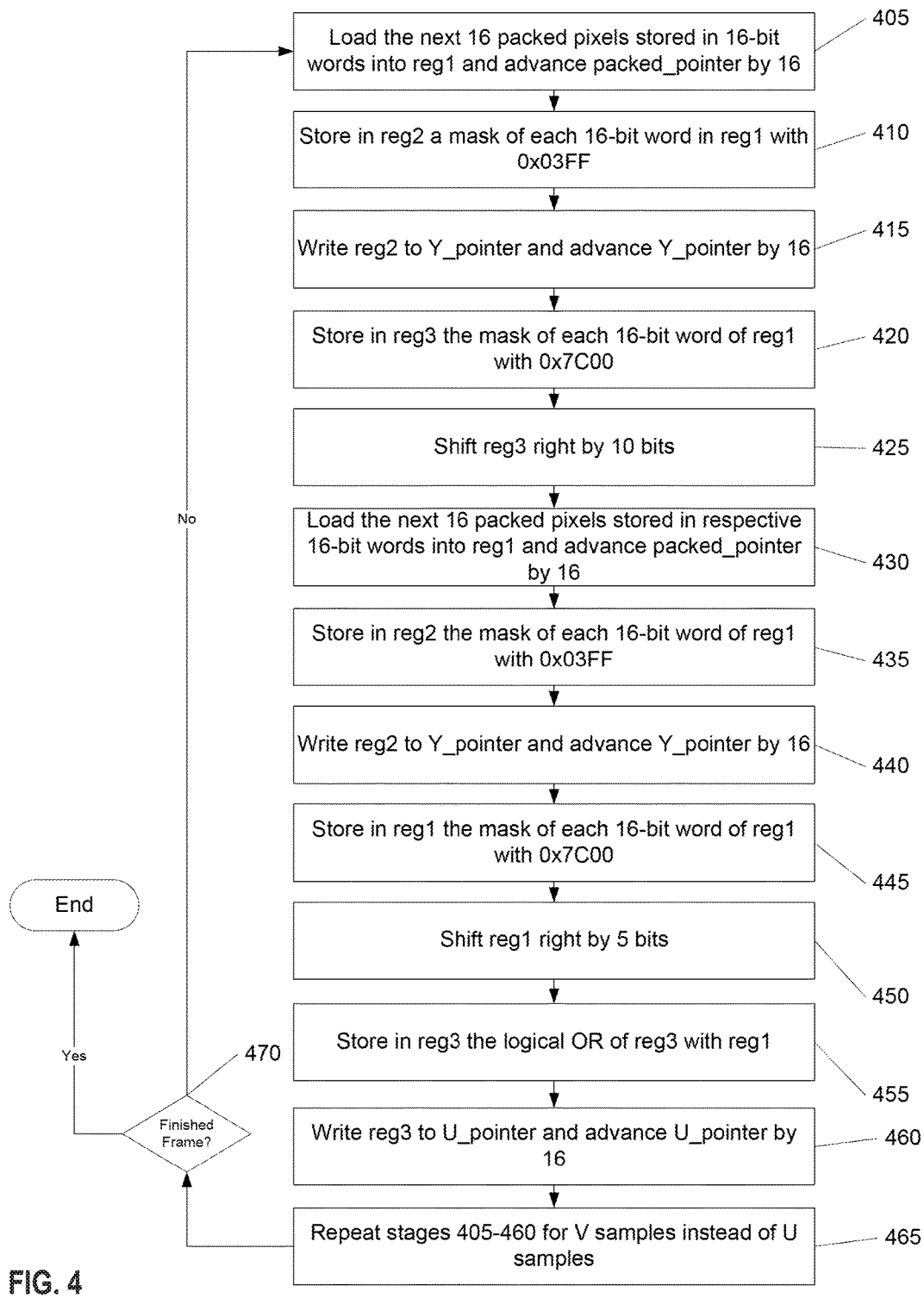
FIG. 4 is a detailed flow chart of a process of efficient 10-bit sample unpacking for distributed processing of 4K video in accordance with a second conversion operation.

FIG. 4 is a detailed flow chart of a process of efficient 10-bit sample unpacking for distributed processing of 4K video. Load the next sixteen packed samples stored in respective 16-bit words (i.e., 256 bits total) into a first register (reg1) and advance packed_pointer by 16 (stage 405). Store in reg2 a mask (logical AND operation) of each 16-bit word of reg1 with 0x03FF to retain the 10-bit Y-component (stage 410). Write reg2 to Y_pointer and advance Y_pointer by 16 (stage 415). Store in reg3 the mask (logical AND operation) of each 16-bit word of reg1 with 0x7C00 to retain the lower 5-bits of the U-component (stage 420). Shift reg3 right by 10-bits (stage 425). Load the next sixteen packed samples stored in respective 16-bit words (i.e., 256 bits total) into the first register (reg1) and advance packed_pointer by 16 (stage 430). Store in reg2 the mask (logical AND operation) of each 16-bit word of reg1 with 0x03FF to retain the 10-bit Y-component (stage 435). Write reg2 to Y_pointer and advance Y_pointer by 16 (stage 440). Store in reg1 the mask (logical AND operation) of each 16-bit word of reg1 with 0x7C00 to retain the upper 5-bits of the U-component (stage 445). Shift reg1 right by 5-bits (stage 450). Store in reg3 the logical OR of reg3 with reg1 (stage 455). Write reg3 to U_pointer and advance U_pointer by 16 (stage 460). Repeat stages 405-460 using V samples instead of U samples (stage 465). If Y-pointer exceeds the end of the Y component (i.e., the total number of samples in the frame), the method stops, else it resumes at stage 405 (stage 470).

In an alternate embodiment, every other row of 3840 Y samples is packed with one of the chroma components and the next row of 3840 Y samples gets packed with the other chroma component. For instance, assuming that the first row is row number zero, the even numbered rows may be packed by iteratively performing stages 405-460, and odd numbered rows row by iteratively performing stage 465.

Each of the methods described above may be performed by a processor or plurality of processors coupled to memory having instructions stored thereon for performing the methods. The processor may include, for example, a microprocessor, microcomputer, digital signal processor, or custom ASIC.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 3 and 4 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 1, 3, and 4 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. An apparatus comprising:
a memory; and
one or more processors coupled to the memory and configured to execute instructions stored in the memory, the instructions comprising:
packing an uncompressed digital video signal, wherein packing the uncompressed digital video signal comprises;
receiving n 10-bit Y samples stored in respective 16-bit words, where n is an integer greater than or equal to 1;
logically ORing the n 10-bit Y samples with a lowest 5-bits corresponding to each of a next n 10-bit U samples;
receiving a first consecutive n 10-bit Y samples stored in respective 16-bit words;
logically ORing a next consecutive n 10-bit Y samples with a highest 5-bits corresponding to each of the next n 10-bit U samples;
receiving a second consecutive n 10-bit Y samples stored in respective 16-bit words;
logically ORing the second consecutive n 10-bit Y samples with a lowest 5-bits corresponding to each of a next n 10-bit V samples;
receiving a third consecutive n 10-bit Y samples stored in respective 16-bit words; and
logically ORing the third consecutive n 10-bit Y samples with a highest 5-bits corresponding to each of the next n 10-bit V samples; and
transmitting the packed digital video signal over a 10 Gbit Ethernet port to a video processing machine.

2. The apparatus of claim 1, wherein n=16.

3. The apparatus of claim 1, wherein logically ORing the n 10-bit Y samples with the lowest 5-bits corresponding to each of the next n 10-bit U samples further comprises logically ORing the n 10-bit Y samples with a lowest 5-bits corresponding to each of the next n 10-bit U samples after masking and shifting U.

4. The apparatus of claim 3, wherein masking and shifting U comprises shifting U left by 10-bits and masking with 0x7C00.

5. The apparatus of claim 1, wherein logically ORing the next consecutive n 10-bit Y samples with the highest 5-bits corresponding to each of the next n 10-bit U samples comprises logically ORing the next consecutive n 10-bit Y samples with a highest 5-bits corresponding to each of the next n 10-bit U samples after masking and shifting U.

6. The apparatus of claim 5, wherein masking and shifting U comprises shifting U left by 5-bits and masking the shifted U with 0x7C00 to retain a highest 5-bits of each of the sixteen 10-bit U samples.

7. The apparatus of claim 1, wherein the n 10-bit Y samples comprise n 10-bit Y pixels;
the n 10-bit U samples comprise n 10-bit U pixels; and
the n 10-bit V samples comprise n 10-bit V pixels.

8. The apparatus of claim 1, wherein receiving n 10-bit Y samples stored in respective 16-bit words, where n is an integer greater than or equal to 1, further comprises storing the received n 10-bit Y samples in a first register.

9. The apparatus of claim 8, wherein logically ORing the n 10-bit Y samples with a lowest 5-bits corresponding to each of a next n 10-bit U samples, further comprises storing the next n 10-bit U samples in a second register.

10. The apparatus of claim 9, wherein logically ORing the n 10-bit Y samples with a lowest 5-bits corresponding to each of a next n 10-bit U samples, further comprises ANDing the second register with hexadecimal value 0x001F and storing a result in a third register.

11. The apparatus of claim 10, wherein logically ORing the n 10-bit Y samples with a lowest 5-bits corresponding to each of a next n 10-bit U samples, further comprises shifting left by 10 bits the third register.

12. The apparatus of claim 11, wherein logically ORing the n 10-bit Y samples with a lowest 5-bits corresponding to each of a next n 10-bit U samples, further comprises logically ORing the first register with the third register.

13. An apparatus comprising:
a memory; and
one or more processors configured to execute instructions stored in the memory, the instructions comprising:
receiving a packed digital video signal over a 10 Gbit Ethernet port from a first video processing machine, wherein receiving the packed digital video signal comprises;
receiving n 10-bit packed samples stored in respective 16-bit words, where n is an integer greater than or equal to 1;
retrieving n 10-bit Y components from the n 10-bit packed samples;
retrieving n 10-bit U lower bits from the n 10-bit packed samples;
receiving a first consecutive n 10-bit packed samples stored in respective 16-bit words;
retrieving n 10-bit Y components from the first consecutive n 10-bit packed samples;
retrieving n 10-bit U upper bits from the first consecutive n 10-bit packed samples;
receiving a second consecutive n 10-bit packed samples stored in respective 16-bit words;
retrieving n 10-bit Y components from the second consecutive n 10-bit packed samples;

retrieving n 10-bit V lower bits from the second consecutive n 10-bit packed samples;

receiving a third consecutive n 10-bit packed samples stored in respective 16-bit words;

retrieving n 10-bit Y components from the third consecutive n 10-bit packed samples; and retrieving n 10-bit V upper bits from the third consecutive n 10-bit packed samples;

unpacking the received digital video signal.

14. The apparatus of claim 13, wherein n=1.

15. The apparatus of claim 13, wherein retrieving n 10-bit Y components from the n 10-bit packed samples comprises logically ANDing each n 10-bit packed samples with n 0x03FF values to retrieve n 10-bit Y components.

16. The apparatus of claim 13, wherein retrieving n 10-bit U lower bits from the first consecutive n 10-bit packed samples comprises ANDing the n 10-bit packed samples with n 0x7C00 values.

17. A method comprising:

receiving, by a first video processing machine, a packed digital video signal over a 10 Gbit Ethernet port from a second video processing machine, wherein receiving the packed digital video signal comprises;

receiving n 10-bit packed samples stored in respective 16-bit words, where n is an integer greater than or equal to 1;

retrieving n 10-bit Y components from the n 10-bit packed samples;

retrieving n 10-bit U lower bits from the n 10-bit packed samples;

receiving a first consecutive n 10-bit packed samples stored in respective 16-bit words;

retrieving n 10-bit Y components from the first consecutive n 10-bit packed samples;

retrieving n 10-bit U upper bits from the first consecutive n 10-bit packed samples;

receiving a second consecutive n 10-bit packed samples stored in respective 16-bit words;

retrieving n 10-bit Y components from the second consecutive n 10-bit packed samples;

retrieving n 10-bit V lower bits from the second consecutive n 10-bit packed samples;

receiving a third consecutive n 10-bit packed samples stored in respective 16-bit words;

retrieving n 10-bit Y components from the third consecutive n 10-bit packed samples; and retrieving n 10-bit V upper bits from the third consecutive n 10-bit packed samples; and unpacking the received digital video signal by the first video processing machine.

18. The method of claim 17, wherein n=1.

19. The method of claim 17, wherein retrieving n 10-bit Y components from the n 10-bit packed samples comprises logically ANDing each n 10-bit packed samples with n 0x03FF values to retrieve n 10-bit Y components.

20. The method of claim 17, wherein retrieving n 10-bit U lower bits from the first consecutive n 10-bit packed samples comprises ANDing the n 10-bit packed samples with n 0x7C00 values.

* * * * *